Feb. 4, 1958
M. V. DE JEAN ET AL
2,822,483
CORE MEMBER INSULATION
Filed Jan. 27, 1954
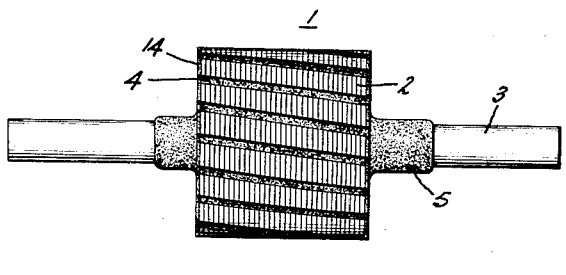
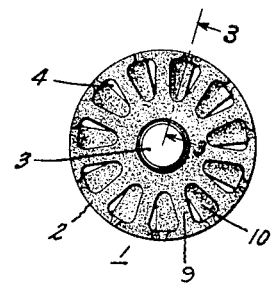
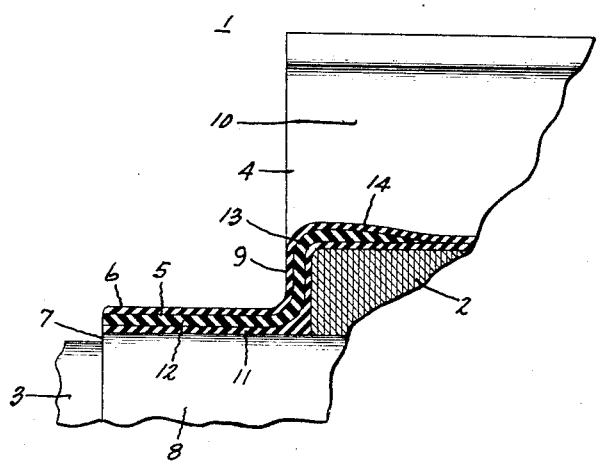
Inventors:
Milton V. De Jean,
Ivan L. Gray,
by *Robert G. Fries*
Their Attorney.

United States Patent Office 2,822,483
Patented Feb. 4, 1958

2,822,483

CORE MEMBER INSULATION

Milton V. De Jean, Fort Wayne, Ind., and Ivan L. Gray, Scotia, N. Y., assignors to General Electric Company, a corporation of New York Application January 27, 1954, Serial No. 406,400

14 Claims. (Cl. 310—45)

This invention relates to dynamoelectric machines and more particularly to insulation for the armatures thereof and to a method of making the same.

Commutator-type dynamoelectric machines conventionally have an armature made up of punched laminations which are stacked together. Slots are formed in the punchings, and, once they have been stacked together, wire is wound into the slots to form motor windings. It is essential that no part of a winding be in electrical contact with the laminations, and therefore some type of insulation is almost universally inserted in the slots before the armature is wound. This is true also for some types of dynamoelectric machines, such as induction motors, which do not have commutators, and, of course, is also applicable to the manufacture and winding of dynamoelectric machine stators. For the sake of simplicity, and in view of the somewhat more acute problems involved, this invention will be discussed in terms of armatures. However, it should be remembered that the invention which will be herebelow brought forth is equally applicable to any dynamoelectric machine core.

For a long time the need has been felt for an armature insulation which will insulate both the slots and the ends of the armature of a dynamoelectric machine, and which will be economical and simple to manufacture. In addition, the insulation should coat the sharp edges of the slots to prevent any cut-through of the winding wire coating at that point. It has not, in the past, been found either practical or economical to use sheet insulation to achieve this double goal. The solution to such a problem has been to find some type of coating so that all parts of the armature may be insulated by immersion in liquid insulation. However, until now, this solution to the problem has not been used because no way has been found to coat an armature quickly and economically so that it will be sufficiently resistant to the heat which invariably is generated in the use of dynamoelectric machines. Thus, it may be seen that the problem is to achieve an insulation which is easy to apply and which has high heat resistant qualities in addition to a high order of insulative ability.

An object of this invention is, therefore, to provide insulation for the armature or stator of a dynamoelectric machine which will incorporate the desirable features set forth above.

Another object of this invention is to provide a simple and economical method of applying such insulation.

Further objects and advantages of this invention will become apparent and the invention will be better understood by reference to the following description and the accompanying drawings; and the features of novelty which characterize this invention will be pointed out with particularity in the claims annexed to and forming a part of this specification.

This invention in one embodiment thereof provides an adhesive base as the first layer of insulation for the slots and ends of an armature. This layer may be any adequate varnish such as an alkyd varnish or any other highly pigmented varnish. A second layer is then applied which this time consists of some insulating material which may, for instance, be any insulating solventless varnish or epoxy resin. Depending upon the function to be performed by the dynamoelectric machine, this second layer may be made to cover only the ends of the armature or it may be caused to extend throughout the slots of the armature. Again depending upon the function of the dynamoelectric machine, a third layer may be superimposed on the first two. This layer would have the double function of providing additional insulation and of providing protection against cutting through of the softer second layer by the coils to be inserted in the armature slots. A preferred material for this layer would be an epoxy type resin. However, any other suitable material, such as, for instance, a phenolic resin could be used. If this third layer is applied it would normally be made to extend both over the ends of the armature and through the armature slots. After each of the three layers has been applied, the armature is dried before the next layer is applied. Any desired means may be used for applying the layers individually, such as dipping or spraying; however, as will appear herebelow, certain methods are preferable, although not requisite, for each layer.

In the drawings:

Figure 1 is a top view of an armature of a dynamoelectric machine which has the improved insulation of this invention;

Figure 2 is an end view of the armature of Figure 1; and

Figure 3 is a cross section along line 3—3 of Figure 2.

Referring now to the figures of the drawing there is shown an armature 1 made up of laminations 2 and having a shaft 3 extending therethrough. Laminations 2 are punched so as to have slots 4 formed therein. In commutator-type machines, a commutator (not shown) is positioned on shaft 3 to one side of armature 1. It will be understood that the armature thus far described and its construction are merely used for purposes of explanation and that the improved insulation of this invention and the method of applying it may be used equally well with other armature constructions, with stator constructions and with the rotors of wound rotor induction motors.

It will be observed that insulation 5 extends along shaft 3 for a short distance, as at 6. Shaft 3 has been provided with a shoulder 7 and an enlarged part 8, and in the present embodiment insulation 5 extends out to the end of enlarged shaft portion 8. An examination of Figure 2 clearly discloses the fact that the end 9 of the armature, the inside surfaces 10 of the armature slots, and the slot corners 14 are all covered with the improved insulation.

Referring now particularly to Figure 3, the formation of the insulation itself will be described. A first thin layer 11 is placed in the slots 4, over the ends 9 of the armature, and over enlarged shaft portion 8. Layer 11 has a primary purpose of providing an adhesive base for the next layer 12 and, therefore, may be made very thin since no insulating function is required of it. It has been found that the best materials to provide an adhesive base are found, particularly in the alkyd varnishes and other highly pigmented varnishes. In small armatures this first layer will normally be between 2 and 5 ten thousandths of an inch thick. While greater thicknesses may be easily achieved they are not necessary for layer 11 to perform its function. A preferred manner of application of layer 11 is to dip armature 1 in the material which is to make up the layer, and then to withdraw the armature at a predetermined speed. As is well known, the rate of withdrawal will be the primary factor in determining the thickness of the layer. After withdrawal, layer 11 is dried; there is no critical factor involved in the speed of drying of the layer, but it has been found that an infra-red bake at approximately 60 degrees centigrade for 5 minutes is highly satisfactory in effecting complete and speedy drying of layer 11.

The second layer 12 is then applied to armature 1; as was mentioned before, this layer may either be made to cover only the ends and the sharp slot corners 14 of the armature 1, as shown in Figure 3, or else extend all the way through slots 4. It was discovered that in order to have a proper thickness of insulation maintained around corners, as at 13, it was necessary for the material to be relatively freely flowing for easy application, but also to have the property of reverting to a semi-solid state as soon as it was applied. Because of this, thixotropic materials were found to be excellently suited to make up layer 12. It has been discovered that thixotropic permafil is a material which is ideally suited to the purpose. It has high insulating qualities and the fact that it is thixotropic causes it to remain in place exactly as it was applied without flowing away from the corners, such as 13. However, any epoxy resin may be made thixotropic to serve the purpose, or an insulating solventless varnish may be used. The preferred method of applying layer 12, particularly where thixotropic permafil is used, is to spray it on. In this case it is desirable to use an acetone thinner to permit spraying; the thinner is present in such quantities that it will evaporate between the time it is sprayed and the time it reaches the surface of layer 11 so that only the insulating material will remain. The thickness of layer 12 is of course determined by the length of time it is sprayed; however, it has been discovered that the optimum range for small armatures is between 2 and 12 thousandths of an inch although, of course, a greater amount will provide greater insulating qualities. Insofar as the application of layer 12 in the slots 4 is concerned, this may again be achieved by dipping and withdrawing at a predetermined rate of speed to achieve a predetermined thickness. The same range of 2 to 12 thousandths of an inch for small armatures as is used on the ends and slot edges 14 of armature 1 is also desirable in the slots 4. Thus, if layer 12 is to be applied only to the ends and slot edges of armature 1 a single spraying operation is sufficient. If it is desired that the layer extend through slots 4 the dipping and withdrawing operation may be added. Once layer 12 has been applied it is dried in any preferred manner. While this operation is not critical, it has been demonstrated that a bake at approximately 125 degrees centigrade for about 45 minutes will completely dry layer 12.

If layer 12 has been extended through slots 4 another layer may be omitted. This is particularly true where layer 12 is composed of an epoxy resin with high qualities of hardness and strength. However where a relatively brittle or soft material has been used, or where extra toughness is desired, a third layer 14 may be applied. This layer will have the double function of additional insulation and of protection for the softer second layer 12. An excellent material for this purpose has been found to be any one of several epoxy type resins. However, the invention should not be construed as being limited to such a type of material since a properly treated phenolic resin will also perform satisfactorily. Layer 14 is preferably applied by a dipping and withdrawing operation, the rate of withdrawal determining the thickness of the layer. It has been determined that the thickness of this outside layer for small armatures will normally lie between three quarters and one and one half thousandths of an inch, but a greater thickness will also achieve the desired result. The third layer is then dried as rapidly as possible, there being no critical limitations to the rate of drying. A 30 minute bake at 175 degrees centigrade has been found to achieve the drying in adequate fashion.

It will be seen from the above that a highly satisfactory type of insulation has been provided, with a simple method of applying the insulation to the armature 1. An insulation such as 5 will eliminate the necessity for sheet type insulation with the high cost of inserting it in each slot individually. In addition, the ends of the armature as well as the slots have been insulated, and the sharp slots edges have been rounded off. This will insure that no undesirable grounding will come about because of carbon dust or other factors, and that no abrasion of the wire coating will be caused by the slot edges. Furthermore, the insulation will always be properly in place around the surface of the slot, thus overcoming the disadvantage of sheet insulation whereby a high degree of care is necessary to insure that the insulation is properly seated in each slot.

While this invention has been explained by describing a particular embodiment thereof, it will be apparent that improvements and modifications may be made without departing from the scope of the invention as defined in the appended claims.

What we claim as new and desire to secure by Letters Patent of the United States is:

1. A core member for a dynamoelectric machine, and an insulating coating for the slots and an end of said core member comprising a thin layer of an adhesive base material applied to an end and to the slots of said core member, and a layer of a thixotropic epoxy resin applied over said first mentioned layer at the end of said core member and over the edges of the slots thereof.

2. A core member for a dynamoelectric machine, and an insulating coating for the slots and an end of said core member comprising a layer of .0002 to .0005 inch in thickness of a varnish type of adhesive base applied to an end and to the slots of said core member, a layer of .002 to .012 inch in thickness of a thixotropic epoxy resin applied thereafter over said first mentioned layer at an end and over the edges of the slots of said core member, and a layer of .002 to .012 inch in thickness of an epoxy resin applied to said slots as a continuation of said second layer.

3. A core member for a dynamoelectric machine, and an insulating coating for the slots and an end of said core member comprising a layer of an adhesive base material applied to an end and to the slots of said core member, a layer of thixotropic insulation applied over said first mentioned layer at an end of said core member and over the edges of the slots thereof, and a layer of a relatively tough material being arranged over said end and said slots to cover said two previously mentioned layers.

4. A core member for a dynamoelectric machine, and an insulating coating for the slots and an end of said core member comprising a thin layer of a varnish type adhesive base material applied to an end and to the slots of said core member, a second layer of thixotropic permafil applied to an end of said core member and to the edges of the slots thereof over said first layer, and a third layer of an epoxy resin material being arranged over said first and second layers thereafter.

5. A core member for a dynamoelectric machine, an insulating coating for the slots and an end of said core member and for that part of a shaft extending therefrom which is adjacent thereto comprising a thin layer of a varnish type adhesive base material applied to an end and to the slots of said core member, a second relatively thick layer of thixotropic solventless varnish applied to an end of said core member and to the shaft adjacent thereto and extending therefrom over said first layer, and a third layer of insulating material arranged over said first two layers.

6. A core member for a dynamoelectric machine, and an insulating coating for the slots and an end of said core member comprising a thin layer of a varnish type adhesive base material applied to an end and to the slots of said core member, a second relatively thick layer formed of a thixotropic epoxy type resin applied to an end of said core member and to the edges of the slots thereof over said first layer, and a third layer of insulating material arranged over said first two layers.

7. A core member for a dynamoelectric machine, and an insulating coating for the slots and an end of said core member comprising a thin layer of a varnish type adhesive base material applied to an end and to the slots of said core member, a second relatively thick layer of thixotropic permafil applied to an end of said core member over said first layer, and a third layer of insulating material arranged over said first two layers.

8. A core member for a dynamoelectric machine, and an insulating coating for the slots and an end of said core member comprising a thin layer of a varnish type adhesive base material applied to an end and to the slots of said core member, a second relatively thick layer of thixotropic permafil applied to an end of said core member over said first layer, a continuation of said second layer being formed of non-thixotropic permafil and being arranged to coat said slots, and a third layer formed of a relatively tough insulating material arranged over said first and second layers.

9. A core member for a dynamoelectric machine, and an insulating coating for the slots and an end of said core member comprising a layer of .0002 to .0005 inch in thickness of a varnish type of adhesive base applied to an end and to the slots of said core member, a second layer of .002 to .012 inch in thickness of thixotropic permafil applied over said first layer at an end of said core member, and a third layer of .00075 to .0015 inch in thickness of an epoxy type resin being arranged over said first and second layers.

10. The insulation of claim 9 wherein a layer of permafil is arranged to coat said slots to form continuation of said second layer.

11. A core member for a dynamoelectric machine, and an insulating coating for the slots and an end of said core member comprising a thin layer of an adhesive base material applied to an end and to the slots of said core member, and a layer of thixotropic material applied over said first mentioned layer at the end of said core member and over the edges of the slots thereof.

12. A method of forming insulation in core member slots and over an end of said core member comprising the steps of immersing said core member in liquid varnish, withdrawing said core member at a predetermined rate of speed to form a layer of predetermined thickness, drying said layer, spraying a thixotropic insulating synthetic resin over an end of said core member, dipping said core member in liquid insulating synthetic resin and withdrawing said core member at a predetermined speed to achieve a predetermined thickness, said predetermined thickness being approximately equal to the thickness achieved by said spray, and drying said resin.

13. A method of forming insulation in core member slots and over an end of the core member comprising the steps of immersing said core member in liquid varnish, withdrawing said core member at a predetermined rate of speed to form a layer of .0002 to .0005 inch in thickness, drying said core member, spraying a thixotropic insulating synthetic resin over an end of said core member to a thickness of .002 to .012 inch, baking said core member until said resin is dry, immersing said core member in liquid epoxy resin, withdrawing said core member at a predetermined rate of speed to form a layer of .00075 to .0015 inch in thickness, and baking the core member until the layer of epoxy resin is dry.

14. A method of forming insulation in core member slots and over an end of the core member comprising the steps of immersing said core member in a liquid varnish, withdrawing said core member at a predetermined rate of speed to form a layer of .0002 to .0005 inch in thickness, drying said core member, spraying a thixotropic insulating synthetic resin over an end of said core member to a thickness of .002 to .012 inch, baking said core member until the resin is dry, immersing said core member in liquid insulating synthetic resin, withdrawing said core member at a predetermined rate of speed to form a layer of .002 to .012 inch in thickness in the slots, said last mentioned layer forming a continuation of said sprayed on layer, baking said core member until said layer in the slots is dry, immersing said core member in liquid epoxy type resin, withdrawing said core member at a predetermined rate of speed to form a layer of .00075 to .0015 inch in thickness, and baking said core member until said layer of epoxy type resin is dry.

References Cited in the file of this patent

UNITED STATES PATENTS

| | | |
|---|---|---|
| 1,171,725 | Jones | Feb. 15, 1916 |
| 2,417,538 | Alexander | Mar. 18, 1947 |
| 2,464,568 | Flynn | Mar. 15, 1949 |
| 2,626,223 | Sattler et al. | Jan. 20, 1953 |
| 2,637,715 | Ott | May 5, 1953 |
| 2,645,626 | Nordlander et al. | July 14, 1953 |

FOREIGN PATENTS

| | | |
|---|---|---|
| 1,023,026 | France | Dec. 24, 1952 |
| 1,034,523 | France | Apr. 8, 1953 |